May 25, 1943.    M. IRELAND    2,319,997
SHOCK ABSORBER
Filed Feb. 5, 1942    2 Sheets-Sheet 1
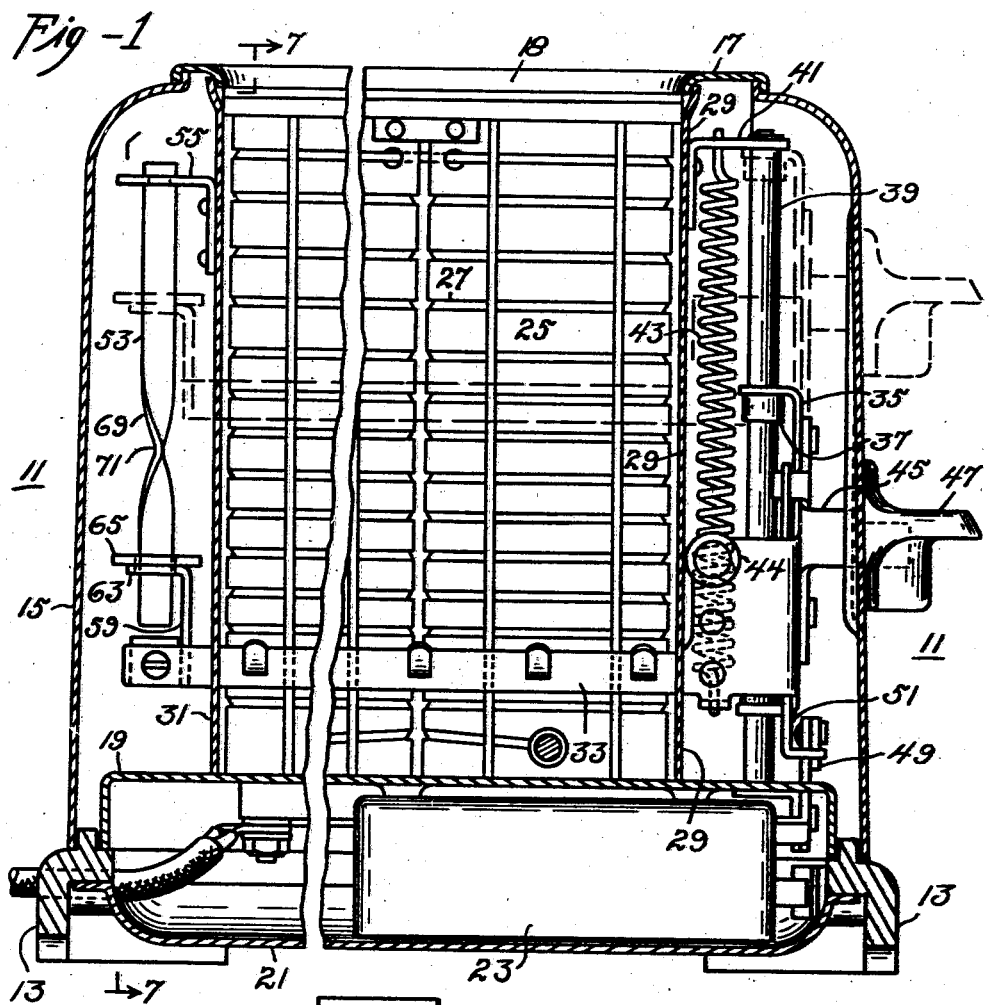
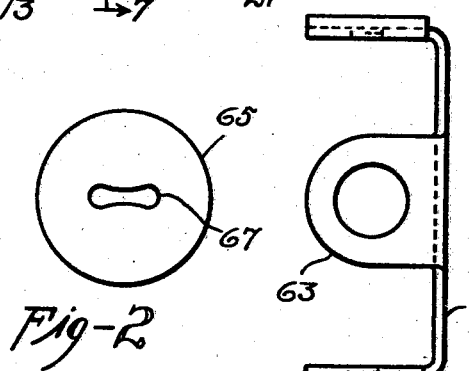
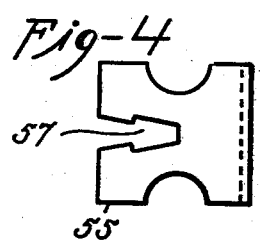
INVENTOR.
Murray Ireland May 25, 1943.  M. IRELAND  2,319,997
SHOCK ABSORBER
Filed Feb. 5, 1942  2 Sheets-Sheet 2
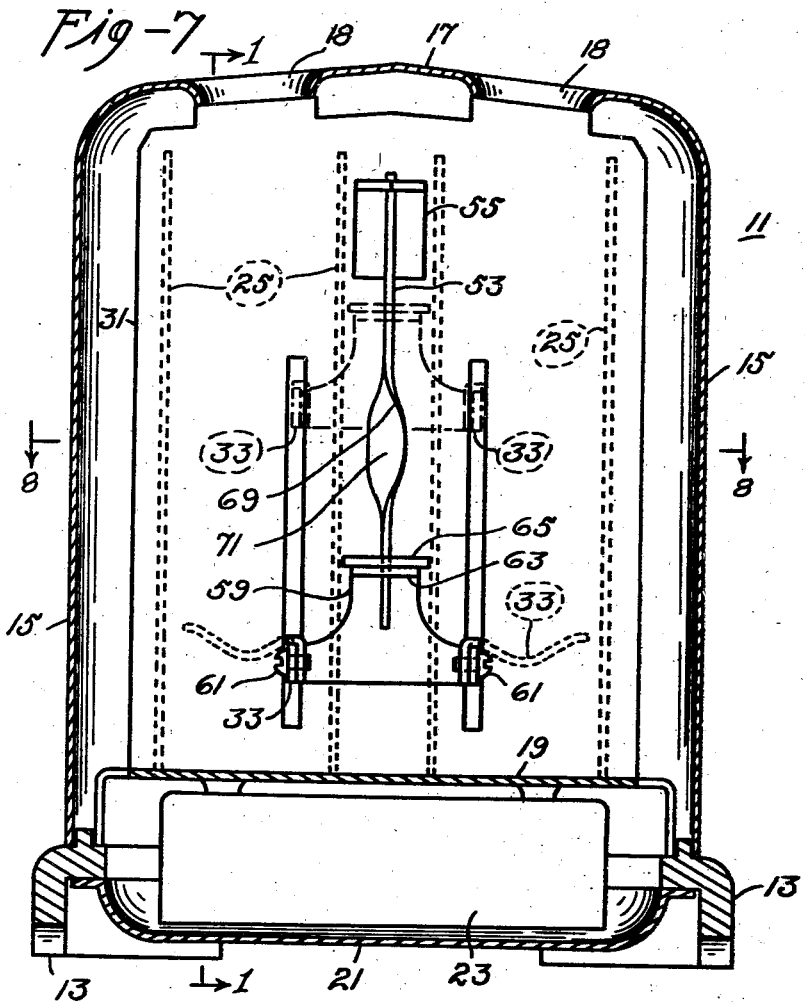
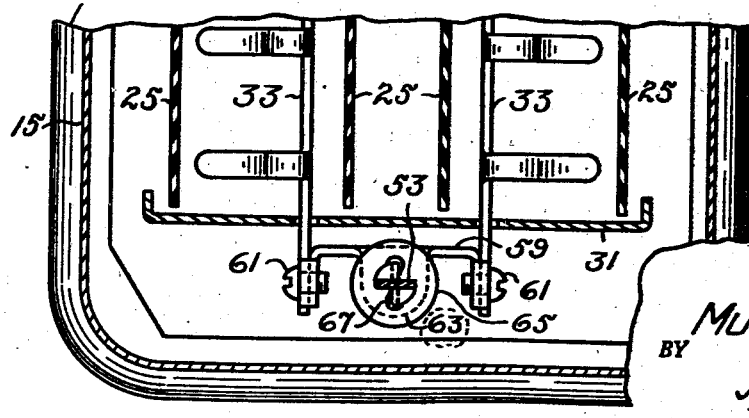
INVENTOR.
MURRAY IRELAND Patented May 25, 1943

2,319,997

UNITED STATES PATENT OFFICE 2,319,997

SHOCK ABSORBER

Murray Ireland, Elgin, Ill., assignor to McGraw Electric Company, Elgin, Ill., a corporation of Delaware Application February 5, 1942, Serial No. 429,632

3 Claims. (Cl. 53—5)

My invention relates to automatic electric toasters and particularly to shock absorbing mechanisms therefor.

An object of my invention is to provide a relatively simple, inexpensive and effective shock absorbing means applied to the bread carrier return mechanism of an automatic electric toaster.

In the drawings,

Figure 1 is a vertical longitudinal sectional view of an automatic electric toaster embodying my invention, taken on the line 1—1 of Fig. 7, Fig. 2 is a top plan view, on an enlarged scale, of a friction disk constituting part of my invention, Fig. 3 is a top plan view, on an enlarged scale, of a bracket and friction plate constituting part of my invention, Fig. 4 is a top plan view of a shock absorber supporting bracket in open position, Fig. 5 is a view similar to Fig. 4 except that the bracket is shown in clamping position, Fig. 6 is a fragmentary sectional view taken on the line 6—6 of Fig. 5, Fig. 7 is a lateral vertical sectional view taken on the line 7—7 of Fig. 1, and, Fig. 8 is a fragmentary horizontal sectional view taken on the line 8—8 of Fig. 7.

In one form of automatic electric toaster which has been manufactured and sold, a bread carrier is vertically reciprocally movable between toast heating elements into an upper non-toasting and a lower toasting position, being normally yieldingly biased into its upper position by a spring, moved downwardly into toasting position at the start of a toasting operation and then quickly returned to its upper non-toasting position at the end of a toasting operation. It has been found desirable to provide shock absorbing means operatively associated with the bread carrier in order to prevent a slice of bread being thrown upwardly and out of the toaster casing as well as preventing shock to the toaster mechanism by absorbing the momentum of the moving parts by bringing them to rest gradually in their upward movement and my invention relates to a particular form of such mechanism.

I have elected to show my invention as applied to a two-slice toaster, of the general kind shown in my issued Patent No. 2,001,362 and a brief description of a toaster structure or assembly will be given in order to show the assembly of the parts embodying my present invention with such toaster.

A toaster 11 includes a skeleton bottom frame 13 which may be made of any suitable or desired moulded composition and a plurality of outer casing walls 15 which, together with an upper part or cover 17, may constitute an outer casing for the toaster. The casing member 15 may rest upon and be secured to the upper face portion of frame 13 in any suitable or desired manner. Slots 18 are provided in cover 17 to permit of inserting therethrough slices of bread to be toasted.

I provide further a bottom plate 19 and a crumb tray 21 which may locate therebetween a timer mechanism 23 which may be either that shown in my Patent No. 1,866,808 or may be of any other suitable or desired kind and which is not described or illustrated in detail since it forms no part of my present invention.

I provide a plurality of planar vertically extending electric heating elements 25 which may include one or more sheets of thin electric-insulating material such as mica having wound thereon a strand 27 of resistance wire, all in a manner well known in the art and any suitable or desired means for supporting and holding the toast heating elements in their proper operative positions may be utilized by me. I provide further a front intermediate wall 29 and a rear intermediate wall 31 now also well known in the art.

I provide bread carriers 33 located between each pair of spaced-apart toast heating elements 25 and the front end portions of these bread carriers may either be connected to a carriage plate 35 or be integral therewith. The carriage 35 is provided with vertically apertured bushings 37 at its upper and at its lower ends, which bushings are adapted to move on a vertical standard 39. The lower end of standard 39 may be held by plate 19 while the upper end may be held in proper operative position by a bracket 41, of substantially L-shape secured to the front intermediate wall 29. The bread carrier 33 is normally yieldingly biased into an upper non-toasting position shown in the broken lines in Fig. 1 of the drawings by a coil tension spring 43, the lower end of which is secured to the front end portion of the carrier 33 while the upper end thereof is secured to the bracket 41. One or more rollers 44 may be rotatably mounted at each side of the carriage plate 35 to rotatably engage the front wall 29 to hold the carriage plate 35 substantially parallel with the front wall 29.

The carriage 35 has secured thereto a forwardly-extending projection 45 having mounted thereon immediately in front of the front wall of casing member 15 an actuating knob 47 whereby an operator may cause downward movement of the bread carrier or bread carriers into toasting position. I provide a detent structure 49 operatively associated with the timer 23 adapted to be engaged by a latch member 51 suitably secured to the carrier 33 so that when the carrier has been moved into its toasting position, the latch 51 may engage with detent 49, whereby the carrier is held in its toasting position and the timing mechanism 23, which was energized or set in operation simultaneously with the downward movement of the carrier into toasting position, will cause release of the latch 51 from the detent 49 at the end of a toasting operation, all as now well known in the art.

As has already been stated, it has been found desirable to provide shock absorbing means to reduce the speed of return of the carrier from toasting into non-toasting position and for this purpose I provide the following parts. A bar 53, which may be of relatively thin flat material but is of non-circular cross-sectional shape, is held in substantially vertical position by being supported at its upper end from an L-shaped bracket 55, this bracket being supported from the rear intermediate wall 31.

Bracket 55 is shown in its initial shape in Fig. 4 of the drawings from which it will be noted that it is provided with a recess 57 which may be initially of generally arrow-head shape to receive the upper recessed end of bar 53 (see Fig. 6). When the bar 53 has been placed in the position shown in Fig. 6 in recess 57, the outer ends of bracket 55 are then moved toward each other into substantially the position shown in Fig. 5 of the drawings which will support bar 53 relatively loosely from bracket 55 to permit its adjusting itself to the position of the other parts interengaging therewith.

The rear end portions of the two bread carriers 33 are mechanically connected by a friction plate member 59 which may be described as being generally of channel shape with its end portions secured to the rear end portions of carriers 33 by short machine screws 61 as will be noted from Figs. 7 and 8 of the drawings. Member 59 is provided intermediate its ends with a friction plate portion 63 which is apertured to receive the bar 53 and it is to be noted that portion 63 is horizontally disposed to receive thereabove and support a friction disk 65 shown more particularly in Fig. 2 of the drawings. This friction disk is provided with a slot 67 centrally thereof through which the bar 53 will extend. It is to be noted that the opening 67 in disk 65 must be made complementary to the cross-sectional shape of bar 53 and when bar 53 is a flat strip of material, the aperture 67 may be substantially that shown in Fig. 2 of the drawings.

As I desire to cause the friction disk 65 to turn on the part 63 of the friction plate member during the upward movement of the carrier into its non-toasting position, I preferably provide a twisted portion 69 on the bar 53 and this twisted portion may comprise two reversibly twisted or bent, relatively short portions of the total length of the bar 53, as will be noted more particularly from Figs. 1 and 7 of the drawings.

Let it be assumed that the carriers 33 were moved to their lowermost position substantially as shown in Fig. 1 of the drawings to conduct a toasting operation and that the toasting operation has been completed with quick return upward movement of the carriers because of the spring 43. The friction disk which was in the position shown in Fig. 1 of the drawings relatively to the vertical bar 53, during the toasting operation, will not be caused to have a turning movement on its support 63 during the initial part of the upward return movement of the carriers 33 but as soon as the lower twisted portion of the bar 53 is reached by the friction disk 65, the disk will be pressed downwardly against its support 63 and will then be caused to rotate or turn through a relatively short arc until it engages the relatively short intermediate portion 71 of the bar 53 after which, in the course of further quick upward movement of disk 65, it will be caused to turn through a small arc in the opposite direction, the same increase of frictional pressure being initially effected. It is evident also that there is an inertia effect because of the weight of the disk during the time of change of speed in the turning movement of the disk 65, so that the greater the weight of the disk the greater will be the resistance to turning movement of the disk.

I have found that a friction type shock absorbing mechanism of this kind is very effective in reducing the speed of upward movement of the carriers and I preferably provide the twisted portion 69 on the bar 53 a relatively short distance above the lowermost position of the friction disk 65 since it is in this portion of the travel of the carrier 33 that the spring 43 is under relatively high tension, which tension, of course, decreases appreciably with the upward return movement of carriers 33, all as well known in such devices.

My device therefore provides a highly effective and relatively simple and inexpensive shock absorbing mechanism of particular use in toasters of this type.

Various modifications may be made in the structure embodying my invention and all such modifications clearly coming within the scope of the appended claims are to be considered as being covered thereby.

I claim as my invention:

1. In an automatic toaster comprising toast heating elements, a bread carrier movable into toasting and non-toasting positions relatively to said toast heating elements and means to yieldingly bias the carrier in non-toasting position and to cause quick return of the carrier from toasting to non-toasting position, the improvement comprising shock absorbing means for the carrier when returning to its non-toasting position, said shock absorbing means including a partly twisted bar of non-circular cross section supported in substantially fixed position on said toaster, a friction disk interengaging with said bar to be rotated thereby when moved longitudinally thereof and a flat friction member movable with said carrier supporting said friction disk and having frictional surface engagement therewith during upward movement of the carrier.

2. In an automatic toaster comprising toast heating elements, a bread carrier movable into toasting and non-toasting positions relatively to said toast heating elements and means to yieldingly bias the carrier in non-toasting position and to cause quick return of the carrier from toasting to non-toasting position, the improvement comprising shock absorbing means for the carrier when returning to its non-toasting position, said shock absorbing means including a bar of non-circular cross-section having a reverse twist in a part of its length, means for supporting said bar in substantially fixed vertical position, a slotted friction disk interengaging with said bar to be rotated thereby when moved longitudinally of said bar and a perforated flat friction plate secured to and movable with said carrier supporting said friction disk to thereby cause limited reverse frictional rotation of said disk on said friction plate during upward movement of said carrier.

3. In an automatic toaster comprising toast heating elements, a bread carrier movable into toasting and non-toasting positions relatively to said toast heating elements and means to yieldingly bias the carrier in non-toasting position and to cause quick return of the carrier from toasting to non-toasting position, the improvement comprising shock absorbing means for the carrier when returning to its non-toasting position, said shock absorbing means including a friction plate supported by said bread carrier and movable therewith, a friction disk resting on the upper surface of the friction plate and carried thereby and means substantially fixedly supported by the toaster and interengaging with said friction disk to cause said disk to be pressed downwardly against said friction plate and then to be turned relatively thereto a plurality of times during the upward movement of the bread carrier and friction plate into non-toasting position.

MURRAY IRELAND.